(12) United States Patent
Matsuura et al.

(10) Patent No.: US 7,055,974 B1
(45) Date of Patent: Jun. 6, 2006

(54) VEHICLE SIDE MIRROR ASSEMBLY WITH REARWARD AND FORWARD VIEWING

(75) Inventors: Masaaki Matsuura, Shizuoka (JP); Masahiro Motomiya, Shizuoka (JP); Hisaya Suzuki, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 11/239,216

(22) Filed: Sep. 30, 2005

(30) Foreign Application Priority Data

Dec. 17, 2004 (JP) .............................. 2004-366846

(51) Int. Cl.
G02B 5/08 (2006.01)
B60R 1/08 (2006.01)
B60R 1/10 (2006.01)

(52) U.S. Cl. ...................................... 359/850; 359/871

(58) Field of Classification Search ................ 359/841, 359/843, 850, 864; 248/475.1
See application file for complete search history.

(56) References Cited

U.S. PATENT DOCUMENTS

| 4,890,907 | A | * | 1/1990 | Vu et al. ..................... 359/843 |
| 4,988,068 | A | * | 1/1991 | Yamana et al. ............. 248/484 |
| 6,015,215 | A | * | 1/2000 | Herman ....................... 359/864 |
| 2001/0030819 | A1 | * | 10/2001 | Hattori et al ................ 359/879 |
| 2003/0026012 | A1 | * | 2/2003 | Pavao ......................... 359/872 |
| 2004/0120055 | A1 | * | 6/2004 | Suzuki et al. ............... 359/850 |
| 2004/0129853 | A1 | * | 7/2004 | Suzuki et al. ............. 248/475.1 |

FOREIGN PATENT DOCUMENTS

| GB | 2194763 | A | * | 3/1988 |
| JP | 05338495 | A | * | 12/1993 |
| JP | 06293238 | A | * | 10/1994 |
| JP | 08238984 | A | * | 9/1996 |
| JP | 10309988 | A | * | 11/1998 |
| JP | 2001039221 | A | * | 2/2001 |
| JP | 2004-299481 | | | 10/2004 |

* cited by examiner

Primary Examiner—Mark A. Robinson
Assistant Examiner—Mark Consilvio
(74) Attorney, Agent, or Firm—Oblon, Spivak, McClelland, Maier & Neustadt, P.C.

(57) ABSTRACT

Disclosed is an outer mirror in which individual components are easy to assemble and which is superior in durability. An outer mirror includes a mirror base having a protrusion which sticks out outward from a side face of a vehicle body, a shaft being placed on the protrusion, and a mirror housing being coupled to the shaft in a rotatable fashion. Furthermore, the mirror housing includes a mirror for showing an area behind the vehicle body, and an opening on its side that faces the vehicle body.

7 Claims, 11 Drawing Sheets

VEHICLE SIDE MIRROR ASSEMBLY WITH REARWARD AND FORWARD VIEWING

CROSS-REFERENCE TO RELATED APPLICATIONS

The present application claims priority under 35 U.S.C. §119 to Japanese Patent Application No. 2004-366846, filed Dec. 17, 2004, entitled "OUTER MIRROR". The contents of that application are incorporated herein by reference in their entirety.

BACKGROUND OF THE INVENTION

1. Field of the Invention

The present invention relates to an outer mirror to be attached to a side door of a vehicle or a surrounding area of the side door.

2. Description of the Related Art

Figure 11:
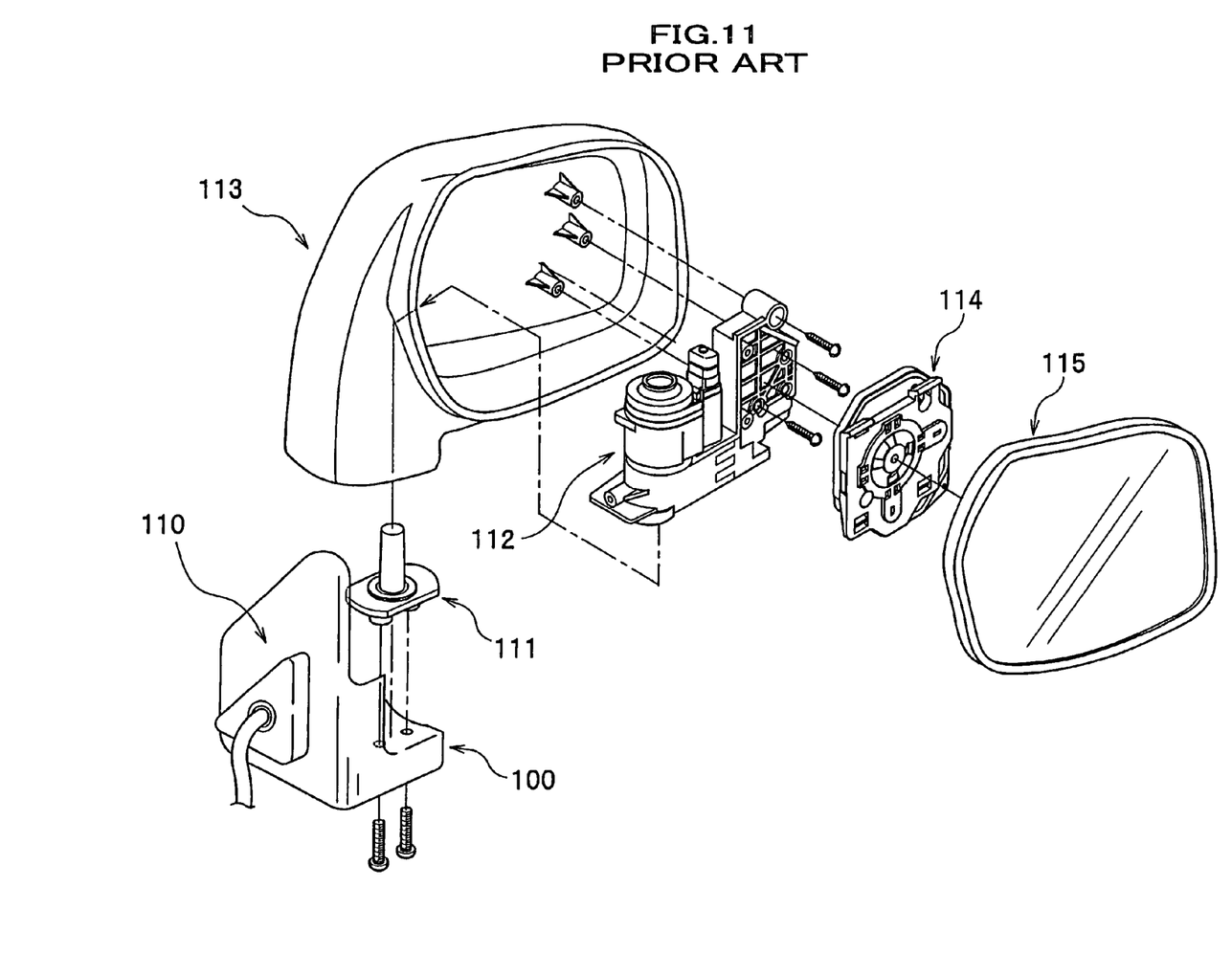
FIG. 11 shows a conventional outer mirror.

Referring to FIG. 11, a typical outer mirror includes as main components:

a) a mirror base 110 that has a ledge 100 protruding from the side of a vehicle body (not shown);

b) a shaft 111 secured to the upper surface of the ledge 100;

c) a mirror housing 113 mounted on the shaft 111 through a drive unit 112 in a rotatable fashion; and d) a mirror 115 fixed to an opening 113A formed on the rear of the mirror housing 113 through an actuator 114 for adjusting the orientation of a mirror surface. As an example of this outer mirror, one described in Japanese Unexamined Patent Application Publication No. 2004-299481 is cited.

In this outer mirror, the frame 120 with the drive unit 112 is required to be inserted into the mirror housing 113 through the opening 113A of the mirror housing 113. This insertion process is time consuming and troublesome, and there is room for improvement.

In addition, it is in demand that the structure of the outer mirror is more resistant to vibrations. This is because the frame 120 is attached to the mirror housing 113 through the opening 113A by the screws 116 on the same axis as the wind blows the outer mirror when the vehicle runs.

Taking the above description into account, the present invention has been conceived. An object of the present invention is to provide an outer mirror in which individual components are easy to assemble and which is superior in durability.

SUMMARY OF THE INVENTION

According to a first aspect of the present invention, there is provided, an outer mirror including:

(a) a mirror base having a protrusion which sticks out laterally from a side face of a vehicle body;

(b) a shaft being placed on the protrusion; and (c) a mirror housing being coupled to the shaft in a rotatable fashion, the mirror housing comprising:

(c1) a mirror for showing an area behind the vehicle body, and (c2) an opening on its side that faces the vehicle body.

In this outer mirror, through the opening, individual components are inserted into the mirror housing, and the components are fixed with clinching tools, promptly. As a result, this outer mirror brings about an advantage that the workability of installing the components is improved. In addition, the installment of the components can be performed through not only this opening but also the opening on the rear of the mirror housing. Use of the two openings in combination allows the workability to be further improved.

Moreover, it is possible to overcome conventional disadvantages that the components cannot be laid out or be fixed due to non-insertion of clinching tools into the mirror housing.

Furthermore, the components can be secured to the inside of the mirror housing firmly. This is because the components can be secured in at least two directions through the openings on the side and on the rear of the mirror housing. Accordingly, the installation of the components can be kept in good condition over a long period of time.

According to a second aspect of the present invention, there is provided, the outer mirror in which an inside of the mirror housing is accessible externally through the opening on the side of the mirror housing.

In this outer mirror, the inside of the mirror housing can be seen by naked eyes through the opening, thus enhancing the workability of, for example, fixing the frame in the mirror housing. In addition, the conditions of the components in the mirror housing can be checked easily with naked eyes without disassembling the mirror housing.

According to a third aspect of the present invention, there is provided, the outer mirror in which the shaft is secured to the protrusion by at least one screw, and the screw is inserted into the protrusion from a bottom of the protrusion, and the insertion of the screw is performed through the opening on the side of the mirror housing.

In this outer mirror, the opening can be used as an insert hole for the screws. Therefore, by inserting the screws through the opening, the shaft can be secured to the protrusion. Even if the insert holes on the bottom of the protrusion are covered partially or wholly by the mirror housing, the screws can be inserted through this opening. This enables the firm attaching of the shaft by the screw.

According to a fourth aspect of the present invention, there is provided, the outer mirror further including an auxiliary mirror for showing an area diagonally forward the vehicle body. Further, this auxiliary mirror seals the opening on the side of the mirror housing.

In this outer mirror, the opening is sealed by the auxiliary mirror whereby the appearance of the mirror housing is enhanced. Since the opening is formed on the side of the mirror housing which faces toward the vehicle body, the auxiliary mirror that seals the opening is easy to see from a driver seat. Consequently, use of the auxiliary mirror allows a driver to check the area diagonally forward the vehicle body easily from a driver seat.

According to a fifth aspect of the present invention, there is provided, the outer mirror in which the mirror housing further includes a swelling portion sticking out from the side of the mirror housing and being positioned beneath the protrusion. Further, the opening is formed on a side of the swelling portion which faces the vehicle body. The swelling portion has a through-hole on its portion that faces the protrusion. The insertion of the screw is performed via the through-hole, and the through-hole is accessible externally through the opening.

In this outer mirror, the screw can be accessed to the through-hole via the opening on the side of the swelling portion which faces the vehicle body, and then, it can be inserted into the protrusion via the through-hole. Thus, it is possible to fix the shaft without interference of the swelling portion.

According to a fifth aspect of the present invention, there is provided, the outer mirror in which the swelling portion is detachable from the mirror housing, and has a coupling portion being attachable to the mirror housing.

In this outer mirror, since the swelling portion can be retrofitted to the mirror housing, the flexibility in designing or molding the swelling portion is enhanced. Furthermore, securing of the shaft to the protrusion is not disturbed by the swelling portion. This brings about an advantage that the flexibility of an assembly process is enhanced.

According to a seventh aspect of the present invention, there is provided, the outer mirror further including a frame for supporting the mirror and being installed in the mirror housing with at least one screw through the opening. Further, the installation of the frame is carried out in a direction perpendicular to an attachment direction of the mirror.

In this outer mirror, the frame is secured to the mirror housing in two or more directions, thereby increasing the attached strength of the frame.

In conclusion, it is possible to provide the outer mirror in which individual components are easy to assemble and which is superior in durability.

Other aspects, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein.

Each of FIGS. 6A and 6B is a perspective view showing the outer mirror with a reflected image.

DETAILED DESCRIPTION OF THE
EXEMPLARY EMBODIMENTS OF THE
INVENTION

A detail description will be given below, of an outer mirror according to first and second embodiments of the present invention with reference to the accompanying drawings. In the following description, the same reference numerals are given to the same components, and duplicate description therefore is omitted. The terms describing orientations, such as front, rear, lateral, upper, and bottom are used with respect to a vehicle body. With respect especially to a surface of an object, the expression "(on) the vehicle body side" frequently means that the surface is located closer to the vehicle body than other surfaces of the object.

First Embodiment

Figure 1:
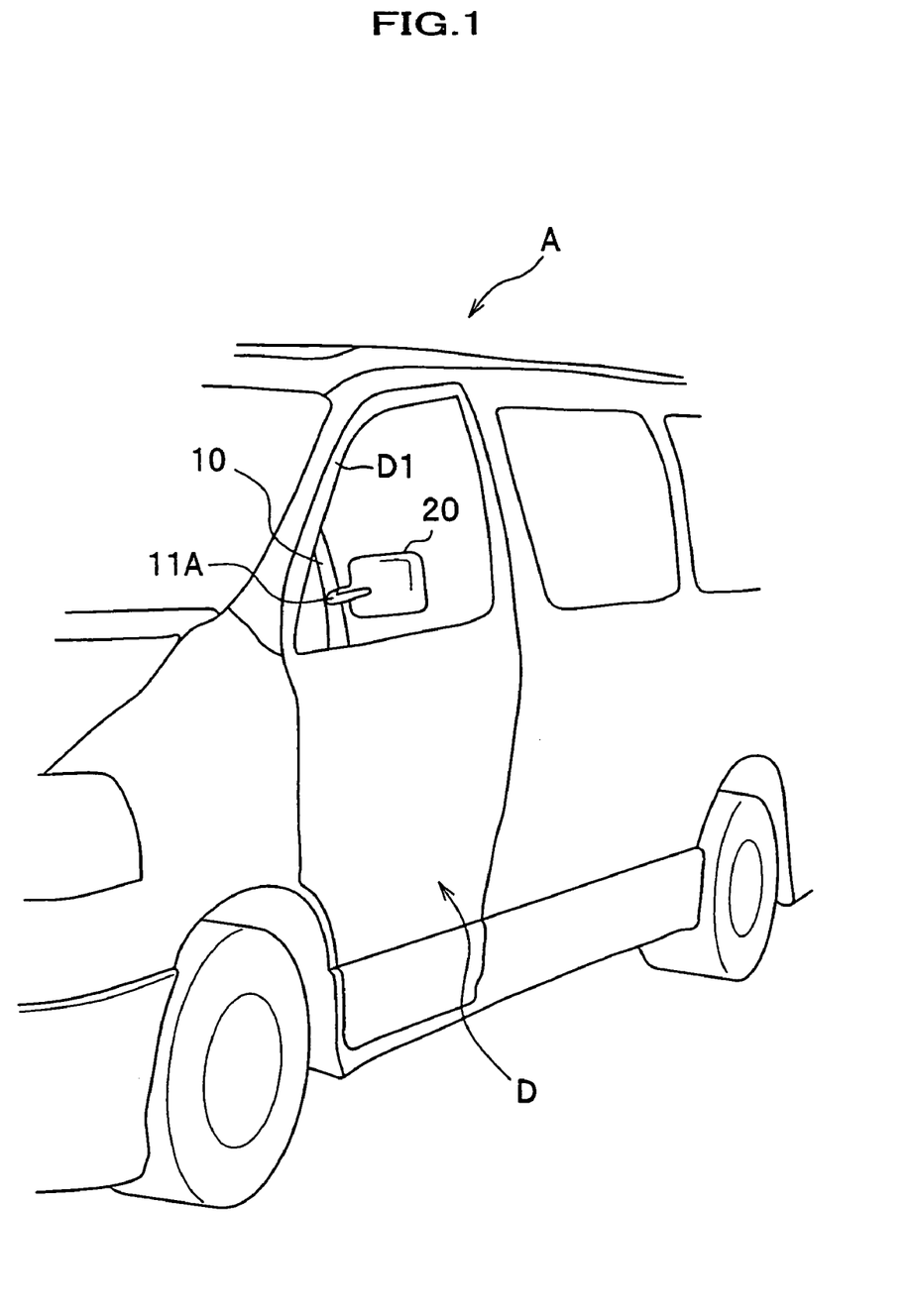
FIG. 1 is a partial perspective view of a left side (passenger seat side) of a vehicle to which an outer mirror according to a first embodiment of the present invention is mounted.
Figure 2:
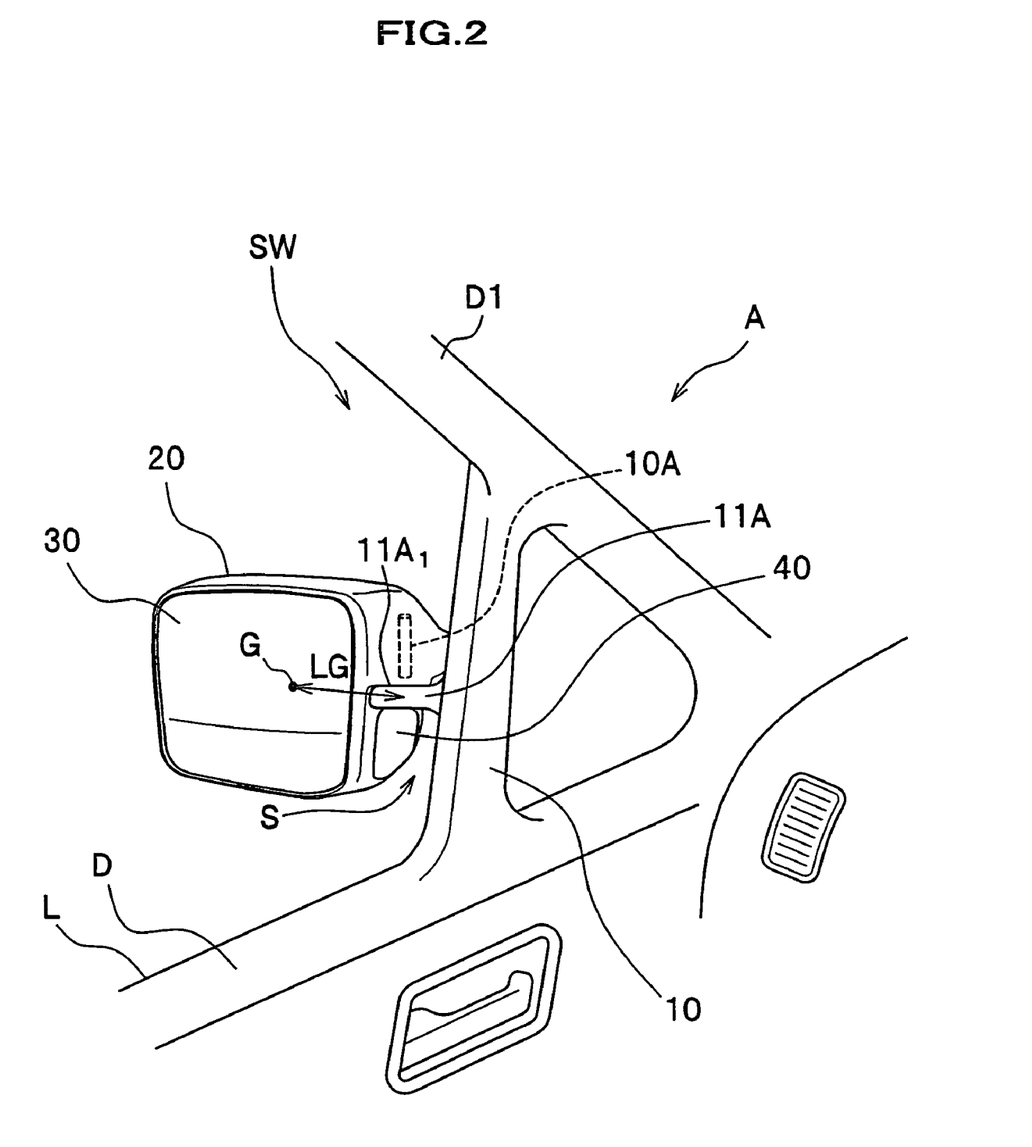
FIG. 2 is a perspective view of the outer mirror seen from a driver seat.

As shown in FIGS. 1 and 2, an outer mirror of this embodiment is what is called a door mirror, mounted on a front side door D on the passenger seat side of a vehicle body A. The outer mirror is composed of a mirror base 10 that has a protrusion 11A extending laterally from a side face of the vehicle body A, and a mirror housing 20 mounted on the upper side of the protrusion 11A. As shown in FIG. 2, a mirror 30 is provided on a rear face of the mirror housing 20, for viewing the rear area, and an auxiliary mirror 40 is provided on the vehicle body side surface of the mirror housing 20, for viewing an area diagonally forward the passenger seat of the vehicle body A, which is not seen directly from the driver seat.

Figure 3:
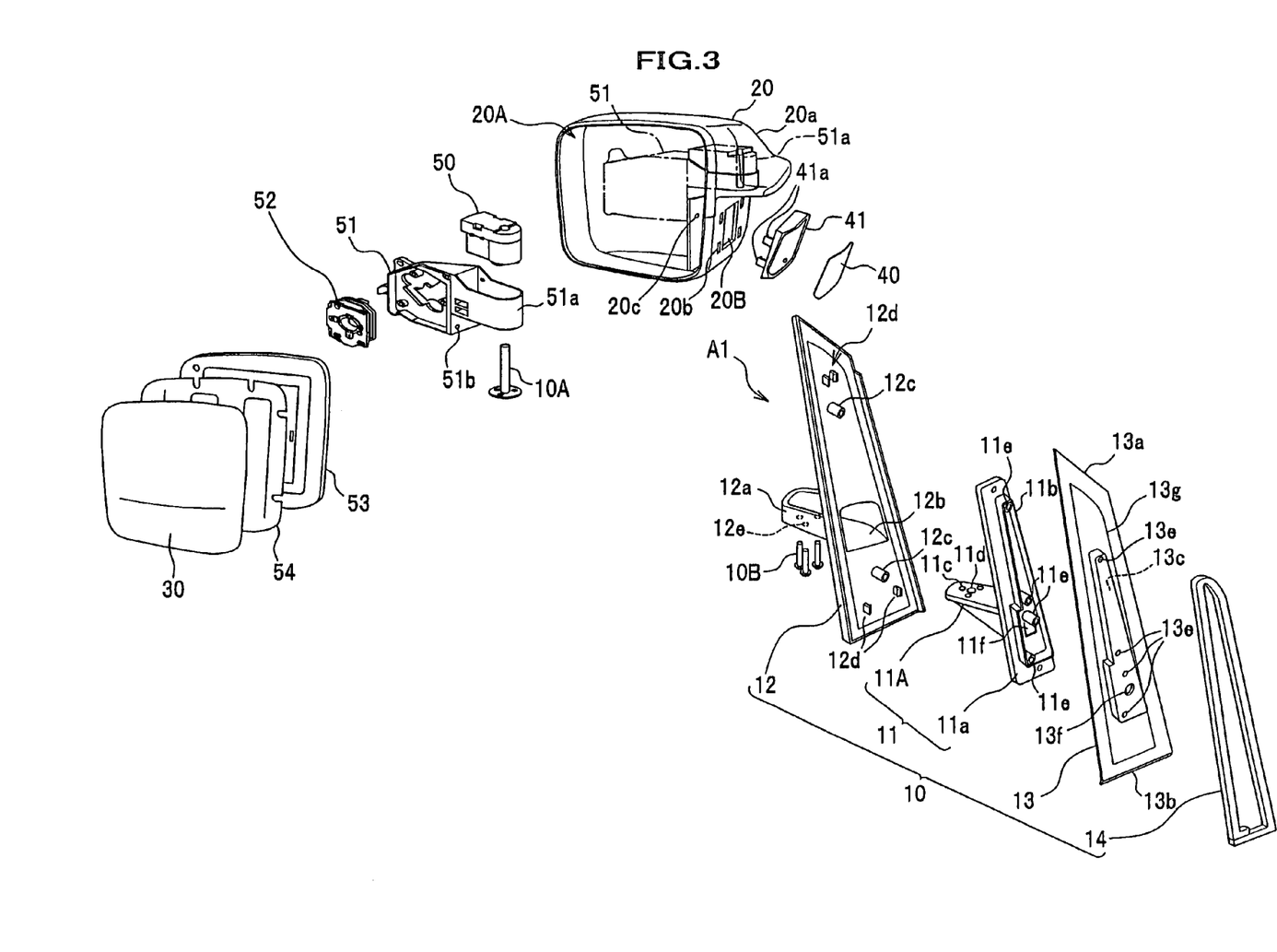
FIG. 3 is an exploded perspective view showing a schematic structure of the outer mirror.

Referring to FIG. 3, the mirror housing 20 is provided with an opening 20B on its vehicle body side surface to which an auxiliary mirror 40 is to be attached.

In this embodiment, the outer mirror is an electrically-operated retractable mirror, and rotatably coupled to a shaft 10A mounted on the upper side of the protrusion 11A of the mirror base 10 (see FIG. 2).

Each component constituting the outer mirror will be described in detail below.

In this embodiment, the mirror base 10 is fixed to a window frame D1 of a front side door D, as shown in FIGS. 1 and 2. The mirror base 10 is composed of: a base main body 11; a base cover 12 covering the surface of the base main body 11 on the outer side A1 relative to the vehicle; a sealing member 13 fixed to the vehicle body side surface of the base main body 11; and a packing 14.

The base main body 11 is formed by, for example, aluminum die-casting, and has a base 11a in a shape of plate, and a protrusion 11A extending laterally (relative to the vehicle body A) from somewhat below the center of the side face of the base 11a. To the base 11a, the base cover 12 is fixed with screws (not shown). The base 11a is equipped with a mounting boss 11b on a face thereof opposed to the sealing member 13, with the mounting boss 11b jutting out to form a frame elongating in an upright direction. In the upper part and bottom part of the mounting boss 11b and the middle part surrounded by the mounting boss 11b, fixing holes 11e are formed each of which serves as a screw hole when the sealing member 13 is screwed to the base main body 11. The protrusion 11A is in a triangular shape which tapers from the base 11a to the end of the protrusion, when seen from the front side or rear side. The upper part of the protrusion 11A has a flat plate face, and the flat plate face has mounting holes 11c for mounting the shaft 10A and a leading hole lid for leading a wire harness (not shown) from the inside of the mirror housing 20 to the vehicle body A, formed therein. Specifically, the wire harness is inserted into the leading hole 11d and pulled out from an opening 11f formed in the middle part of the base 11a surrounded by the mounting boss 11b.

The base cover 12 has a cover part 12a protruding from the vehicle body side to the outer side A1. The cover part 12a covers the protrusion 11A of the base main body 11 with at least the upper face of the protrusion 11A being exposed, when the base cover 12 and the base main body 11 are coupled together. The face of the base cover 12 for mounting the base body 11 has an insertion opening 12b communicating with the cover part 12a, and fixing holes 12c, 12c which serve as screw holes when the base main body 11 is screwed to the base cover 12. On the bottom part of the cover part 12a, insertion holes 12e are formed to face and align with the mounting holes 11c in the protrusion 11A of the base main body 11. Coupling the base cover 12 to the base main body 11 is carried out simply by screwing screws (not shown) into the corresponding fixing holes 12c from the vehicle body side of the base main body 11. In the vicinity of each of the fixing holes 12c, 12c, a pair of hooks is provided which is engageable with respective engaging part (not shown) formed in the sealing member 13.

The sealing member 13 is in a form of plate, with the upper edge 13a and the bottom edge 13b of the plate being unparallel to each other, so that the edges fit to the corresponding edges on the vehicle body side surface of the base cover 12. In the middle part of the sealing member 13, a receiving recess 13c is formed for receiving the mounting boss 11b of the base main body 11. The receiving recess 13c has screw holes 13e corresponding to respective fixing holes 11e in the base main body 11, for inserting fixing screws (not shown). The receiving recess 13c has a drawing hole 13f at the position corresponding to the opening 11f of the base main body 11, for drawing the wire harness from the mirror base to the inside of the vehicle. Crease part 13g is formed in the vehicle body side surface of the sealing member 13, in order to facilitate the mounting of the packing 14 on the sealing member 13.

Coupling the sealing member 13 to the base main body 11 can be carried out simply by screwing screws (not shown) into the corresponding fixing holes 11e through the respective screw holes 13e from the vehicle body side of the sealing member 13. The packing 14 is mounted between the sealing member 13 and the mounting stage (not shown) on the vehicle body.

As shown in FIG. 2, the mirror housing 20 is horizontal-rotatably mounted on the upper side of the protrusion 11A through the shaft 10A. In this embodiment, as described above, a rectangle opening 20B is formed on the vehicle body side of the mirror housing 20, and it makes it possible to access externally the flame 51 and other components installed within the mirror housing 20. Furthermore, the opening 20B is sealed by the mounting member 41 that is a member for attaching the auxiliary mirror 40 to the mirror housing 20.

The mounting member 41 has engaging hooks 41a on the back side of the face on which the auxiliary mirror 40 is mounted. By engaging the engaging hooks 41a with the engaging holes 20b formed in the lower part of the vehicle body side surface of the mirror housing 20, the auxiliary mirror 40 can be mounted. Since the mounting member 41 is a separate piece from the mirror housing 20 as explained above, the thickness thereof in the lateral direction relative to the vehicle body can be varied to thereby adjust the gap S, i.e. the distance between the mirror surface of the auxiliary mirror 40 and the side face of the base cover 12 of the mirror base 10 on the exterior side of the vehicle. Therefore, the auxiliary mirror 40 can appropriately reflect the image which may differ depending on types of vehicle, by selecting the mounting member 41 having a suitable thickness in the lateral direction relative to the vehicle body. In other words, the gap S can be adjusted simply by exchanging mounting member 41, and it is unnecessary to exchange the mirror housing 20 itself for different type of vehicle. As a result, there arises an advantage in that the auxiliary mirror can be standardized, thereby reducing overall costs. In addition, since the mounting member 41 is extremely smaller than the mirror housing 20, storing the parts for exchanging is facilitated, and the operation for exchange is kept simple.

Figure 8A:
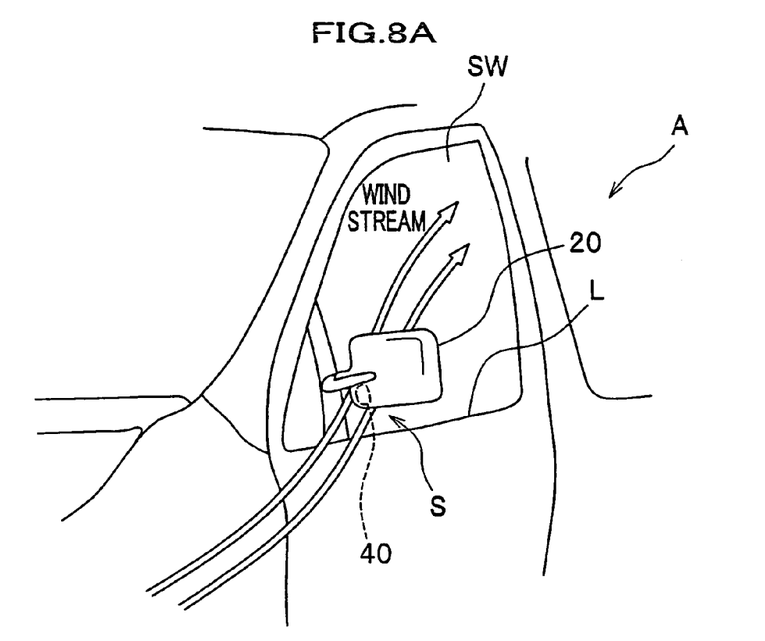
FIGS. 8A and 8B are schematic diagrams explaining flow of wind when the vehicle is running.
Figure 8B:
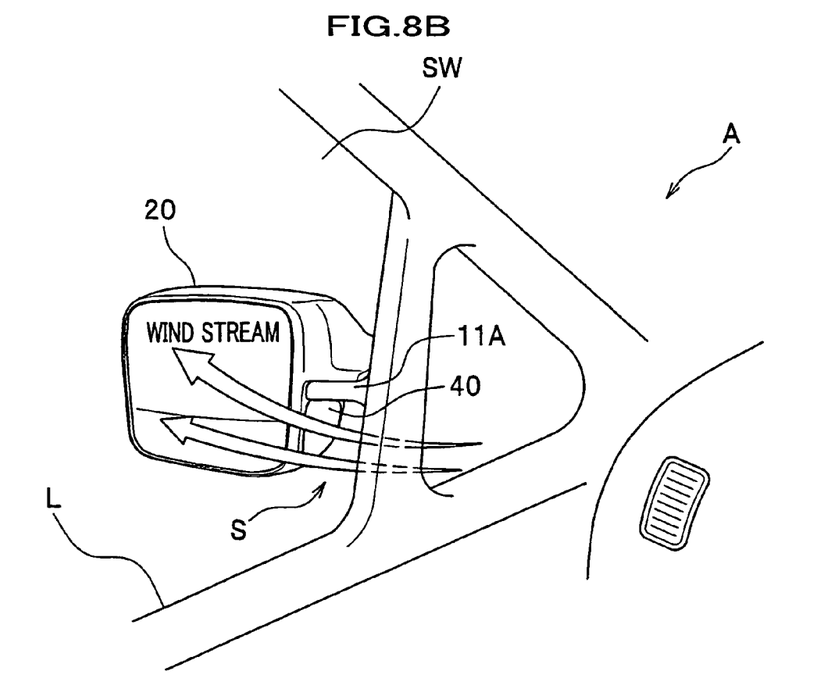

The mounting member 41 corresponds to "swelling portion" herein. When being attached to the mirror housing 20, the mounting member 41 sticks out from the mirror housing 20 beneath the protrusion 11A. This gap S allows wind stream hitting the outer mirror during running of the vehicle to smoothly pass rearward, as shown in FIGS. 8A and 8B. As a result, turbulence caused by the outer mirror is reduced, which in turn lessens noise including wind roar. At the same time, wind stream passing through the gap S will blow off rainwater or the like attached to the auxiliary mirror 40. Such a stream passing through the gap S will further blow off rainwater or the like attached to the side window SW of the vehicle. Therefore, a clear area which is located on the sight line from the driver seat to the outer mirror is secured on the side window SW.

As shown in FIG. 2, the mirror housing 20 is horizontal-rotatably mounted on the upper side of the protrusion 11A through the shaft 10A. In this embodiment, the mirror housing 20 is supported by the protrusion 11A at nearly the center of the vehicle body surface of the mirror housing 20, so that the auxiliary mirror 40 is located below the upper face 11A1 of the protrusion 11A. In other words, the outer mirror of this embodiment has a similar structure to the conventional outer mirror (see FIG. 11) in that the mirror housing 20 is supported by the protrusion 11A on the upper face 11A1 of the protrusion 11A, while the auxiliary mirror 40 is still located below the upper face 11A1 of the protrusion 11A.

In addition, when being mounted, the mirror housing 20 is located above the bottom edge line L of the side window SW of the vehicle body A. It should be noted that the auxiliary mirror 40 may be located below the bottom edge line L, as long as the auxiliary mirror 40 can be seen from the driver seat.

The gravity center G of the mirror housing assembly is located laterally away from the protrusion 11A in the protruding direction of the protrusion 11A. The distance LG between the root (fixing portion) of the protrusion 11A and the gravity center G is shorter than that of the outer mirror shown in FIG. 11, so that the mirror housing 20 is held stably. Therefore, the vibration of the mirror housing 20 during running of the vehicle is lessened effectively.

The auxiliary mirror 40 is a wide-angle curved mirror and, thus can reflect a wide area diagonally forward the side face of the vehicle body A. The mirror surface of the wide-angle curved mirror is in a shape obtained by cutting a segment out of a sphere. A radius of curvature of the auxiliary mirror 40 ranges from 100 mm to 1,000 mm, preferably from 100 mm to 500 mm. When the radius of curvature is below 100 mm, the distortion of the image on the auxiliary mirror 40 becomes large, and it thus becomes difficult to recognize the image. When the radius of curvature is above 1,000 mm, the surface property becomes closer to that of the plane mirror, and the property of the wide-angle curved mirror is thus degraded. Therefore, with respect to the radius of curvature, the above-mentioned range from 100 mm to 1,000 mm is selected so that the distortion is reduced as well as the reflected space is wide. The above-mentioned range from 100 mm to 500 mm is preferably selected, so that the wider area can be reflected, including the area diagonally forward the passenger seat of the vehicle body A as well as the space immediately below the mirror base 10.

Furthermore, as shown in FIG. 2, the auxiliary mirror 40 is oriented downward to some extent (to put it another way, the auxiliary mirror 40 is mounted in such manner that at least a part of the mirror face of the auxiliary mirror 40 can be seen from the position below the mirror base 10 (including the position immediately below)). By selecting the radius of curvature of the auxiliary mirror 40 within the range of 100 mm to 500 mm, the auxiliary mirror 40 can suitably reflect a wide area covering the area below the mirror base 10 to the area diagonally forward the side face of the vehicle body A. Generally, the lower part of the mirror housing 20 on the vehicle body side on which the auxiliary mirror 40 is mounted is configured to be thick in the front-rear direction, in order to deal with the wind stream while the vehicle is running. Therefore, the larger auxiliary mirror can be mounted, as compared with those mounted on other part of the vehicle (especially on other part of the outer mirror). Therefore, the auxiliary mirror 40 to be mounted at such a position is suitable for reflecting a wider area diagonally forward the side face of the vehicle body A.

By use of the fixing screws 10B, the above-mentioned shaft 10A is fixed to the protrusion 11A extending from the base main body 11 of the mirror base 10, and stands upright on the upper face of the protrusion 11A. Due to this structure, the fixing screws 10B need to be screwed into the protrusion 11A through the insertion openings 12e of the bottom face of the cover part 12a, in order to fix the shaft 10A. If a lower part of the vehicle body side surface of the mirror housing 20 is jutting out and covers the bottom face of the protrusion 11A, that is, covers the insertion holes 12e of the cover part 12a, it may become impossible to insert the fixing screws 10B into the insertion holes 12e. On the other hand, if the auxiliary mirror 40 is attached to the mirror housing 20 by means of the mounting member 41 as a separate part, the lower portion of the vehicle body side surface of the mirror housing 20 can be made flat, which allows the insertion holes 12e of the cover part 12a to be exposed completely. Therefore, insertion and screwing of the fixing screws 10B are facilitated.

In the mirror housing 20 above the upper face of the protrusion 11A (in the upper portion 20a on the lateral side of the mirror housing 20), a driving device 50 is placed (in FIG. 3, shown with an alternate long and short dash line) which allows the mirror housing 20 to retract to the storage (folded) position or to resume the use (unfolded) position.

The driving device 50 includes a decelerator to be secured to the shaft 10A and a motor for generating driving force (both not shown), and the driving force generated by the motor is transferred to the shaft 10A through the decelerator. When the motor is activated, the mirror housing 20 pivots on the shaft 10A. By appropriately controlling the direction of the motor rotation, the mirror housing 20 is allowed to retract to the storage position or to resume the use position.

In this embodiment, the driving device 50 is held in a holding part 51a formed on the vehicle body side of a frame 51, which is to be fixed to the interior of the mirror housing 20 (on the front side relative to the mirror 30). On the rear side of the frame 51, a mirror holder 53 is affixed through the actuator 52 which is for adjusting the tilt angle of the mirror 30. A sheet-shaped heater 54, which is to defrost the mirror 30, is placed between the mirror holder 53 and the mirror 30.

In the lower part of the vehicle body side surface of the frame 51, a screw hole 51b is provided with the opening thereof facing towards the vehicle body. A screw can be screwed into the screw hole 51b through the mounting hole 20c formed in the mirror housing 20. This insertion through the opening 20B is done by the screws as will be described later.

It should be noted that size, shape and the like of the mirror housing 20 can be varied depending on the design or other factors, and the mirror housing should not be limited to those shown in the drawings. When the lower part of the mirror housing 20 on the vehicle body side is thickened in a front-rear direction of the vehicle, the mirror 40 of a larger size can be used, and accordingly, a wider area can be reflected on the mirror 40. In this case, the opening 20B is enlarged as well, thus making the insertion easier.

The wire harness (not shown) for providing electric power to the driving device 50 and the actuator 52 is routed through the shaft 10A. Specifically stated, the wire harness is made to pass through the shaft 10A. Then, it goes through the leading hole 11d formed in the protrusion 11A, the interior of the mirror base 10 (base main body 11), the drawing hole 13f formed in the sealing member 13 of the mirror base 10, and the interior of the vehicle body A. Finally, it is connected to the control unit (not shown) nearby the driver seat.

Assembling process of the outer mirror according to the embodiment will be explained below with reference to FIG. 3.

First, the driving device 50 and the actuator 52 are built in the frame 51. This frame 51 is inserted into the mirror housing 20 through the opening 20A formed on the rear side of the mirror housing 20, and the frame 51 is fixed to the mirror housing 20 with fixing screws (not shown). This fixing process can be carried out through the opening 20B on the vehicle body side of the mirror housing 20 as well as the opening 20A on the rear side of the mirror housing 20. To put it another way, the frame 51 is fixed to the mirror housing 20 with the screws inserted in the directions crossing to each other, i.e. from the opening 20A and the opening 20B. The fixing of the frame 51 through the opening 20B is conducted as follows, as seen from FIG. 3: a screw (not shown) is inserted from the opening 20B, made to pass through the mounting hole 20c of the mirror housing 20, and screwed into the screw hole 51b.

Prior to fixing the frame 51 to the mirror housing 20, the shaft 10A is coupled to the driving device 50, and the wire harness is led out through the hole in the shaft 10A. When the frame 51 is mounted in the mirror housing 20, the bottom part of the shaft 10A is exposed from the bottom opening of the upper portion 20a on the side of the mirror housing 20.

Next, the mirror holder 53 is fixed to the actuator 52 by means of claws and corresponding engaging mechanism thereof (not shown). The heater 54 is attached to the back side of the mirror holder 53 by means of an adhesive tape or the like. The mirror 30 is attached to the back side of the heater 54 on the back side by means of an adhesive tape or the like.

The base main body 11 is covered with the base cover 12, and screws (not shown) are screwed from the base main body 11 on the vehicle body side into the respective fixing holes 12c formed in the base cover 12 to thereby integrate the base main body 11 and the base cover 12 into a single piece.

Subsequently, the shaft 10A of the mirror housing assembly is brought in proximity to the protrusion 11A of the base main body 11, and the wire harness is inserted into the leading hole 11d of the protrusion 11A of the base main body 11. The shaft 10A is placed over the protrusion 11A, and the fixing screws 10B are inserted from the bottom side of the cover part 12a of the base cover 12 through the respective mounting holes 11c of the protrusion 11A, and through the holes in the shaft 10A to thereby fix the shaft 10A to the protrusion 11A.

The mounting member 41 is mounted on the lower part of the vehicle body side surface of the mirror housing 20, and the auxiliary mirror 40 is attached to the mounting member 41 with an adhesive tape or the like. It should be noted that, by attaching the auxiliary mirror 40 to the mounting member 41 in advance, assemblage can be conducted efficiently. In this way, the mounting member 41 can be retrofitted to the mirror housing 20. Accordingly, securing of the shaft 10A to the protrusion 11A is not disturbed by the mounting member 41. This brings about an advantage that an assembly process is made flexible. In addition, if the auxiliary mirror 40 is attached to the mounting member 41 beforehand, then the assembly process is done more smoothly.

Next, the sealing member 13 is mounted on the base main body 11 by screwing screws into the fixing holes 1ie of the base main body 11 through the screw holes 13e of the sealing member 13. Upon mounting the sealing member 13 on the base main body 11, the wire harness is led out from the drawing hole 13f of the sealing member 13.

The vehicle body side surface of the sealing member 13 is fixed with the mounting screws or the like to the mounting stage (not shown) provided on the window frame D1 of the front side door D of the vehicle body A, with the packing 14 being sandwiched between the sealing member 12 and the mounting stage. In this manner, the outer mirror is mounted to the vehicle body A.

A viewing area from the driver seat of the vehicle that is equipped with the outer mirror will be explained below, with reference to FIGS. 4 to 6.

Figure 6A:
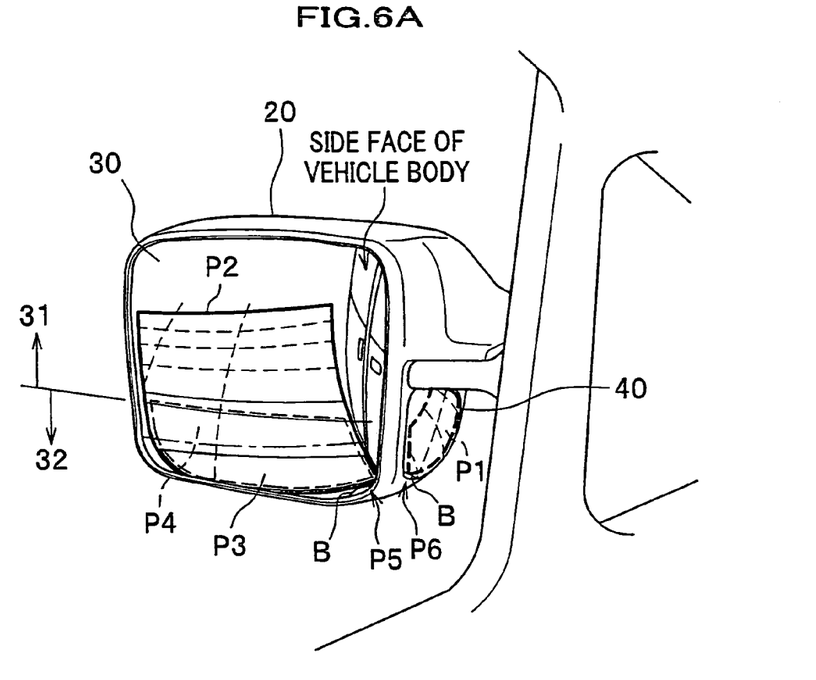
FIG. 6A shows an image reflected when a vehicle is in a regular driving mode.
Figure 6B:
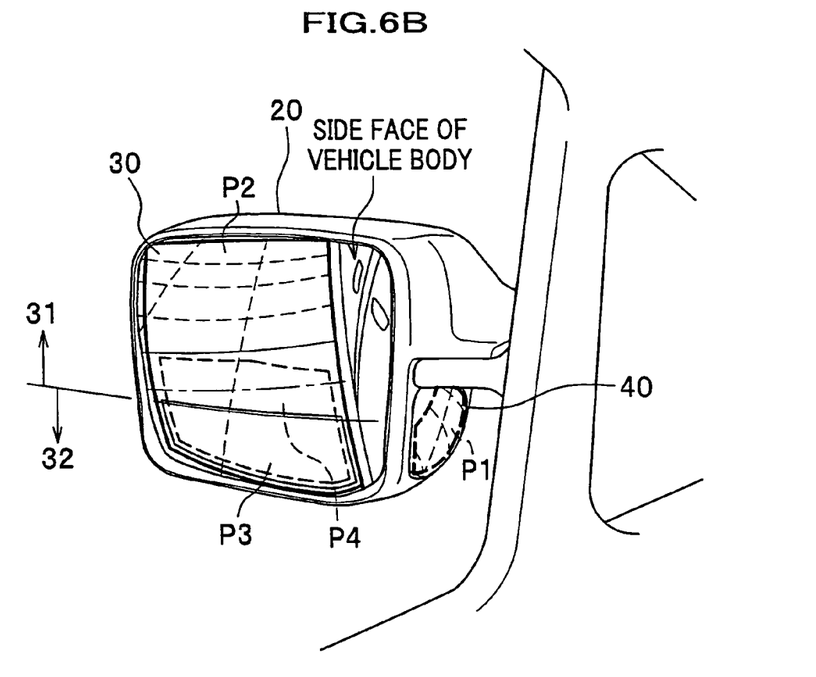
FIG. 6B shows an image reflected when a shift lever is in a reverse position.

Each of FIGS. 6A and 6B is a perspective view showing the outer mirror with a reflected image. FIG. 6A shows an image reflected when a vehicle is in a regular driving mode. FIG. 6B shows an image reflected when a shift lever is in a reverse position. In this embodiment, as to the mirror 30 for rear-viewing, one formed of a spherical (or convex) part 31 as an upper part having a radius of curvature of 700 mm and an aspherical part 32 as a lower part is used. This mirror has the surface that can tilt by a predetermined angle relative to the road surface diagonally backward the passenger seat of the vehicle body as shown in FIG. 6B when a shift lever (not shown) accessible from the driver seat is set in a reverse position. As for the auxiliary mirror 40, one having a radius of curvature of 200 mm and an area of 55 cm$^2$ is used.

Figure 4:
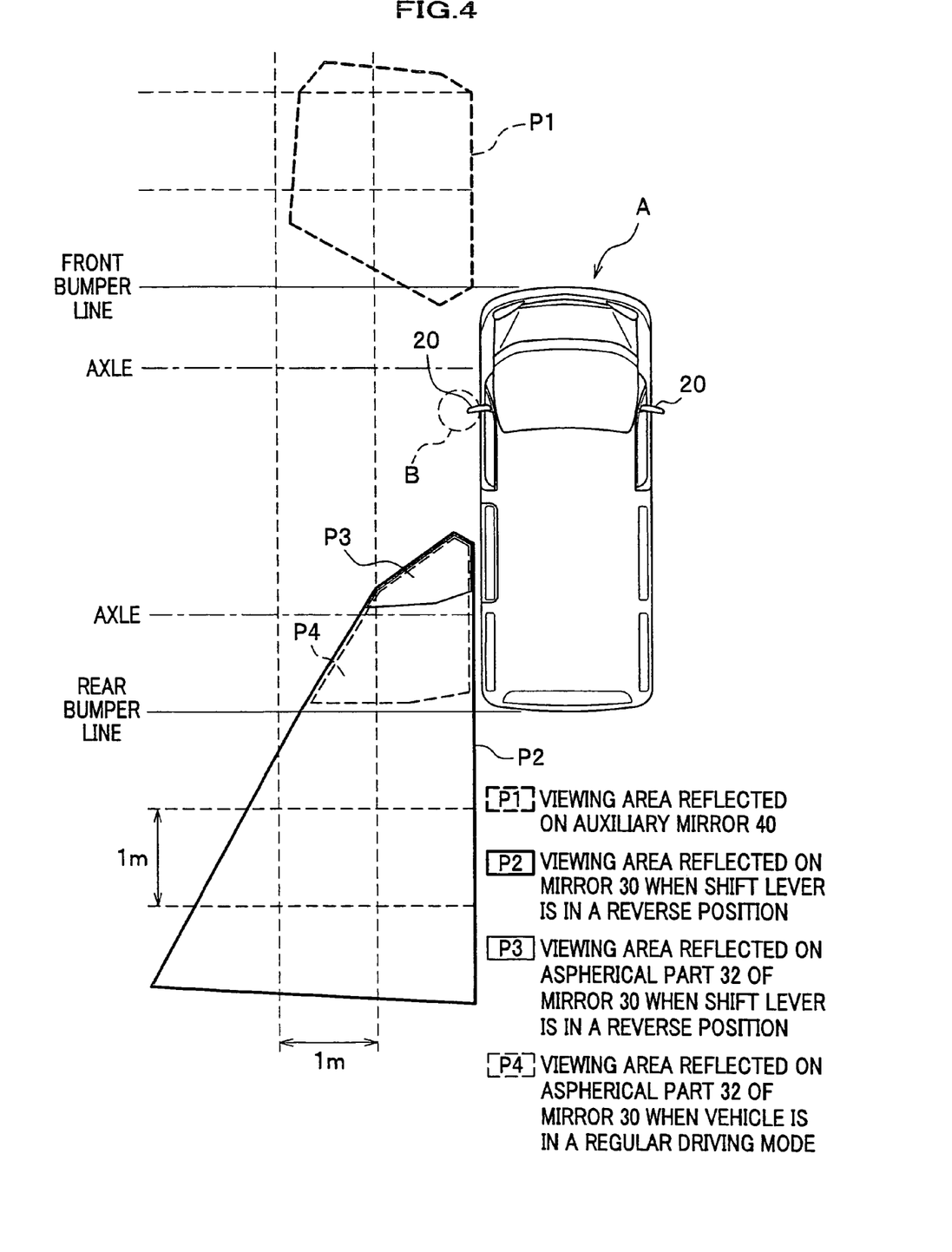
FIG. 4 is a schematic diagram explaining areas reflected by the outer mirror.

In FIG. 4, an area P1 bounded by a bold dashed line depicts a viewing area reflected on the auxiliary mirror 40. The viewing area P1 is reflected on the auxiliary mirror 40, as shown in FIGS. 6A and 6B.

Also in FIG. 4, an area P2 bounded by a bold solid line depicts a viewing area reflected on the mirror 30 when the shift lever is in a reverse position. The viewing area P2 is reflected on the mirror 30, and is shown over the spherical part 31 and the aspherical part 32 as shown in FIG. 6B.

Furthermore, in FIG. 4, an area P3 shown with a thin solid line depicts a viewing area reflected on the aspherical part 32 of the mirror 30 when the shift lever is in a reverse position. The viewing area P3 is reflected on the aspherical part 32 of the mirror 30, as shown in FIG. 6B.

Again in FIG. 4, an area P4 bounded by a thin dashed line depicts a viewing area reflected on the aspherical part 32 of the mirror 30 when the vehicle is in a regular driving mode. The viewing area P4 is reflected on the aspherical part 32 of the mirror 30, as shown in FIG. 6A.

As can be seen from the above, it is possible to reflect a wider area covering front and rear sides in the vicinity of the side face of the vehicle body A on the passenger seat side, by use of the outer mirror of the embodiment including the auxiliary mirror 40 and the mirror 30.

Figure 5:
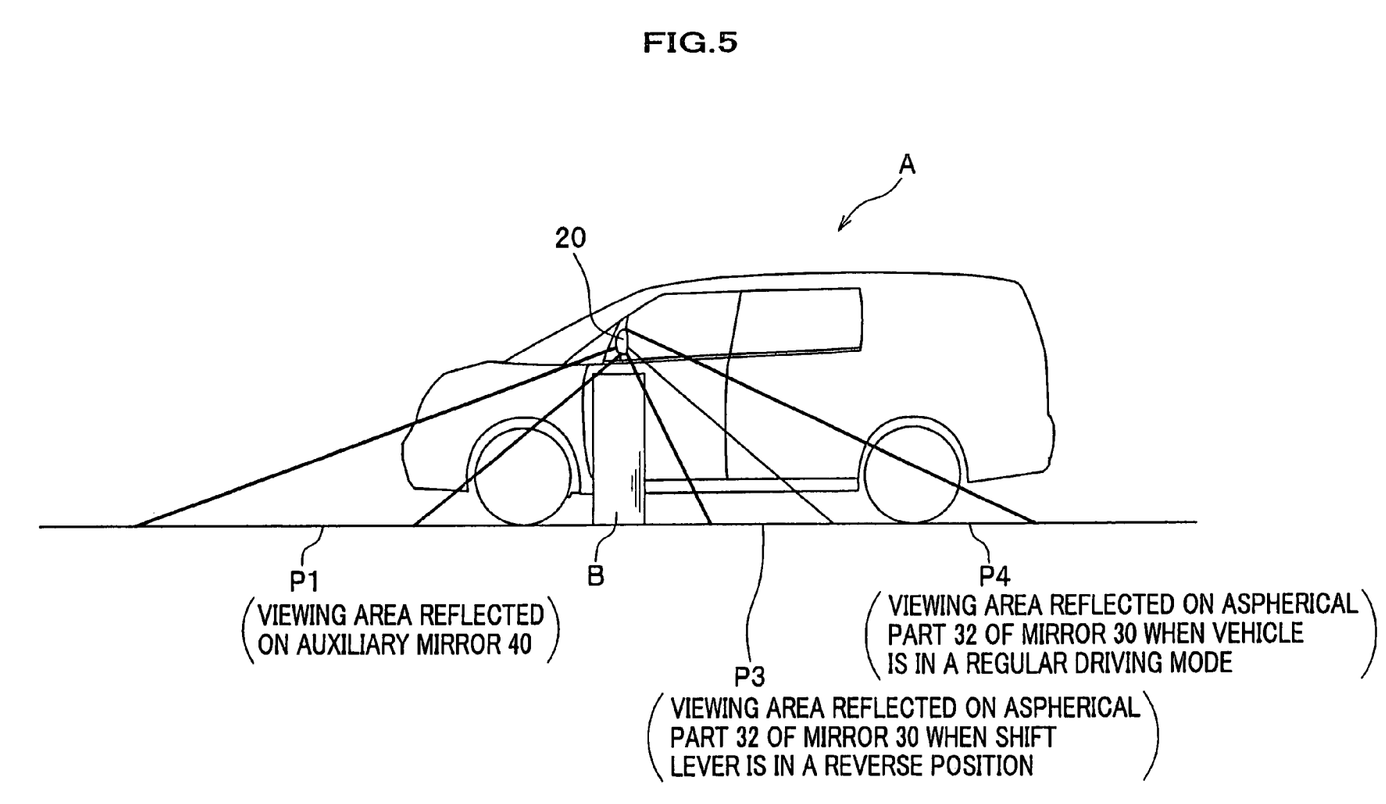
FIG. 5 is a schematic diagram seen from the side of the vehicle body explaining viewing area by the outer mirror.

It is assumed that an object B having a height of 1 m and a diameter of 30 cm is placed immediately below the outer mirror on the passenger seat side with the object being brought into contact with the vehicle body A as shown in FIGS. 4 and 5. The image of the object B appears on the corner area P5 of the mirror 30 and the corner area P6 of the auxiliary mirror 40, as shown in FIG. 6A. The reason why the image of the object B is reflected on two mirrors is that the top corners of the object B are covered in the viewing area P1 by the auxiliary mirror 40 and the viewing area P3 by the aspherical part 32 of the mirror 30, as shown in FIG. 5. Therefore, the outer mirror of this embodiment can reflect the image of the object B located within an area immediately below the outer mirror which tends to be a blind spot in general.

Figure 7A:
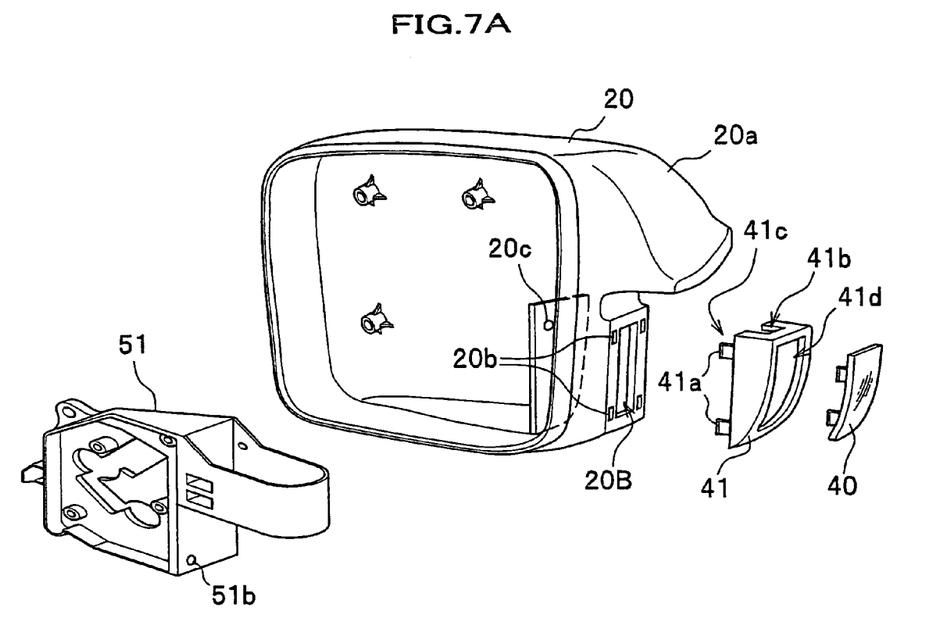
FIGS. 7A and 7B show modified embodiments of the outer mirror of the present invention.
Figure 7B:
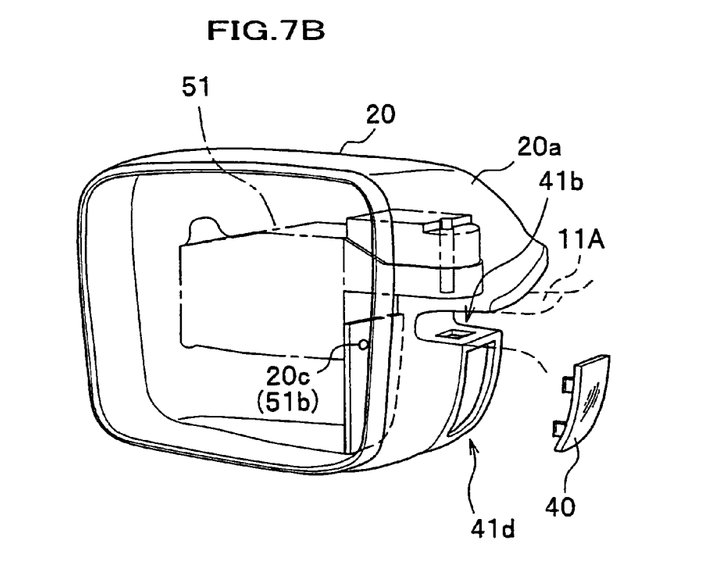

FIGS. 7A and 7B show outer mirrors according to modified embodiments of the present invention.

In the case of the outer mirror shown in FIG. 7A, the mounting member 41 has an upper face in a shape of nearly U with squared corners when seen from above. The upper face and a side face to be attached to a mirror housing 20 have openings 41b and 41c, respectively. On the side face of the mounting member 41 for mounting the auxiliary mirror 40, an opening 41d is provided, and the rim of the opening 41d has a step that engages with hooks formed on the auxiliary mirror 40 to thereby mount the auxiliary mirror 40 on the mirror housing 20.

According to such an outer mirror, the assemblage of the outer mirror can be effectively carried out utilizing the openings 41b, 41c and 41d on the mounting member 41. In other words, upon fixing the shaft 10A to the protrusion 11A formed on the base main body 11 of the mirror base 10 (see FIG. 3), there may be a problem in that the mounting member 41 having a certain thickness as shown in the first embodiment may hinder the insertion of the fixing screws 10B, and therefore, the mounting member 41 needs to be mounted on the mirror housing 20 after the fixing screws 10B are screwed. With the outer mirror of this modified embodiment, even when the mounting member 41 is mounted on the mirror housing 20 in advance, the fixing screws 10B can be inserted and screwed through the openings 41b and 41d. As a result, alternative processes are possible in the production process. Even after the mounting member 41 is mounted on the mirror housing 20, if the auxiliary mirror 40 is not attached to the mounting member 41, the opening 41d is exposed and the interior of the mirror housing 20 is accessible through the opening 41d and the opening 20B. The frame 51 or the like can be fixed with a clinching tool through the opening 41d and opening 20B. Even after the auxiliary mirror 40 is attached to the mounting member 41, disassembly of the frame 51 is easily conducted by removing the auxiliary mirror 40 and exposing the opening 41d.

In the case of the outer mirror shown in FIG. 7B, the mirror housing 20 has a portion integrally formed with the mirror housing 20 that jets out from the lower part of the vehicle body side surface of the mirror housing 20. In other words, in this outer mirror, the mirror housing 20 is integrally formed with the mounting member 41 shown in FIG. 7A.

According to the above outer mirror, it becomes possible to assemble the outer mirror in a manner similar to that explained above in which the openings 41b and 41d provided in the jetting-out portion are utilized. In other words, although being provided with the swelling portion (mounting member 41) sticking out beneath the protrusion 11A, the mirror housing 20 can be fixed to the shaft 10A by the screws 10B. In this outer mirror, it is possible to eliminate the process of attaching the mounting member 41 as described above, thereby simplifying the assembly process. In this case, the step of mounting the mounting member 41 is omitted, and therefore the production process becomes shorter.

With the above-described outer mirror, it is possible to insert components into the mirror housing 20 through the opening 20B, and to secure components to the inside of the mirror housing 20 with clinching tools smoothly. This is because the opening 20B is located facing toward the side of the vehicle body. Consequently, the process of attaching components is made easier.

Furthermore, by utilizing the opening 20A on the back surface of the mirror housing 20 in addition to the opening 20B, the workability is further improved.

Moreover, as described above, due to the fact that clinching tools can be inserted into the mirror housing through the opening 20B, it is possible to overcome disadvantages such as components cannot be laid out or be fixed.

The components can be secured in two or more directions, that is, from both the opening 20A (formed on the back of the mirror housing 20) and the opening 20B. This makes it possible to ensure that the components are attached to the mirror housing 20. As a result, the attaching of the components can be kept in good conditions over a long period of time.

Since the inside of the mirror housing 20 is accessible externally from the opening 20B, the interior can be viewed by naked eyes. This enables the improvement in the workability, for example, attaching of the frame 51 to the mirror housing 20.

In addition, the conditions of the components can be checked easily with naked eyes without disassembling the mirror housing 20.

The shaft 10A is secured to the protrusion 11A with the screws 10B to be inserted from the bottom of the protrusion 11A. The opening 20B can be used as an insert hole for the screws 10B. Therefore, the screws 10B that are to be inserted through the opening 20B can secure the shaft 10A to the protrusion 11A.

Even if in the mirror housing 20, the insert holes for the screws 10B on the bottom of the protrusion 11A are covered partially or wholly, the screws 10B can be inserted through the opening 20B. Thus, the screws 10B ensure the attaching of the shaft 10A.

The opening 20B is sealed by the mounting member 41 to which the auxiliary mirror 40 for showing the diagonally front side of the vehicle body A is attached. The auxiliary mirror 40 and the mounting member 41 hide the opening 20B whereby the appearance of the mirror housing 20 is enhanced. The opening 20B is formed on the side of the mirror housing 20, facing toward the side of the vehicle body. Hence, the auxiliary mirror 40 that seals the opening 20B is easy to see from a driver seat. Consequently, a driver can check the area diagonally forward the vehicle body A easily from a driver seat by using the auxiliary mirror 40.

The frame 51 is attached to the inside of the mirror housing 20 by the screws to be inserted through the opening 20B, and the attaching of the frame 51 is thus performed in the direction perpendicular to that of the attaching of the mirror 30. As a result, the frame 51 is secured to the mirror housing 20 in two different directions, thereby increasing the attached strength of the frame 51.

Second Embodiment

Figure 9:
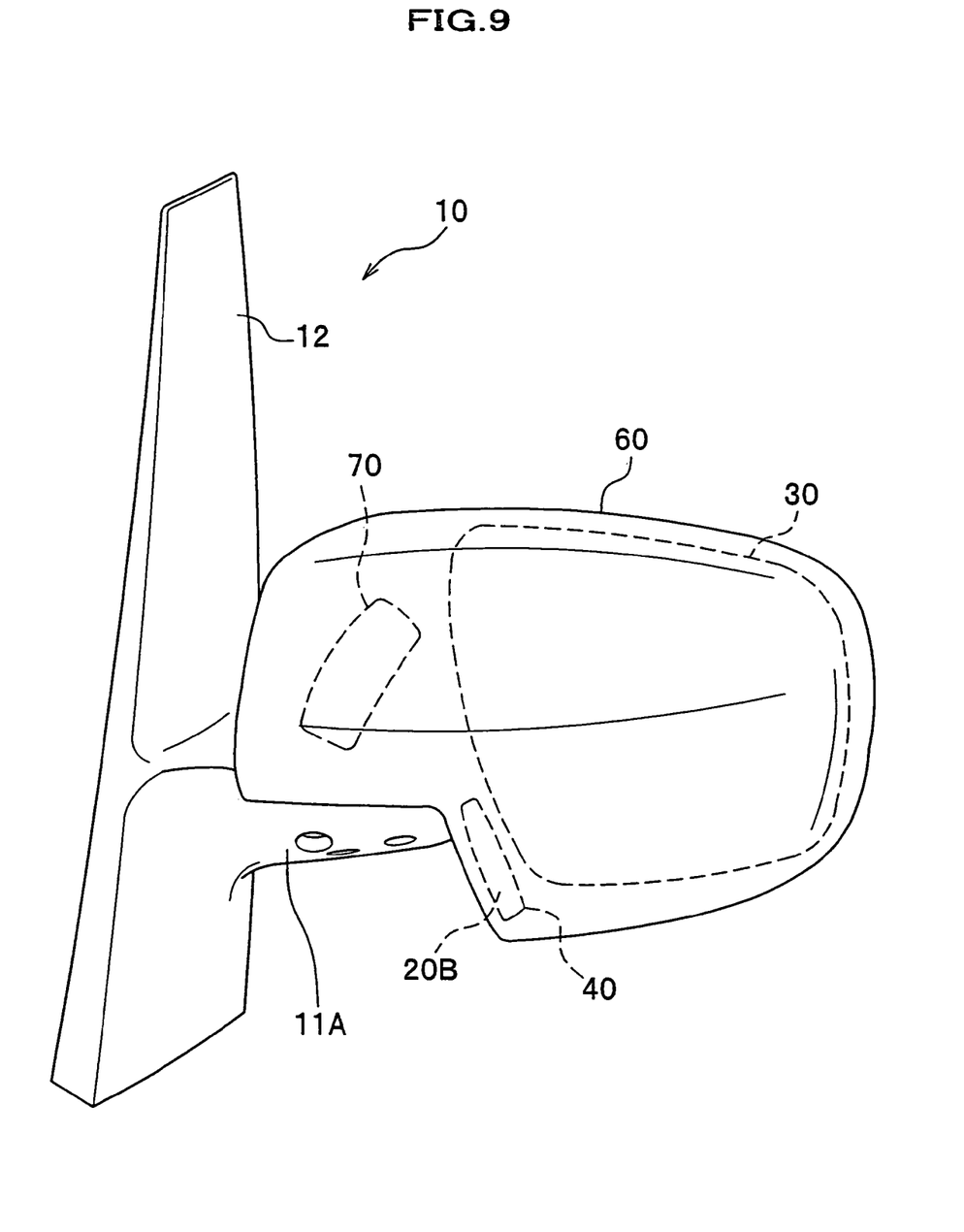
FIG. 9 is a perspective view of an outer mirror according to the second embodiment of the present invention seen from the front side.
Figure 10:
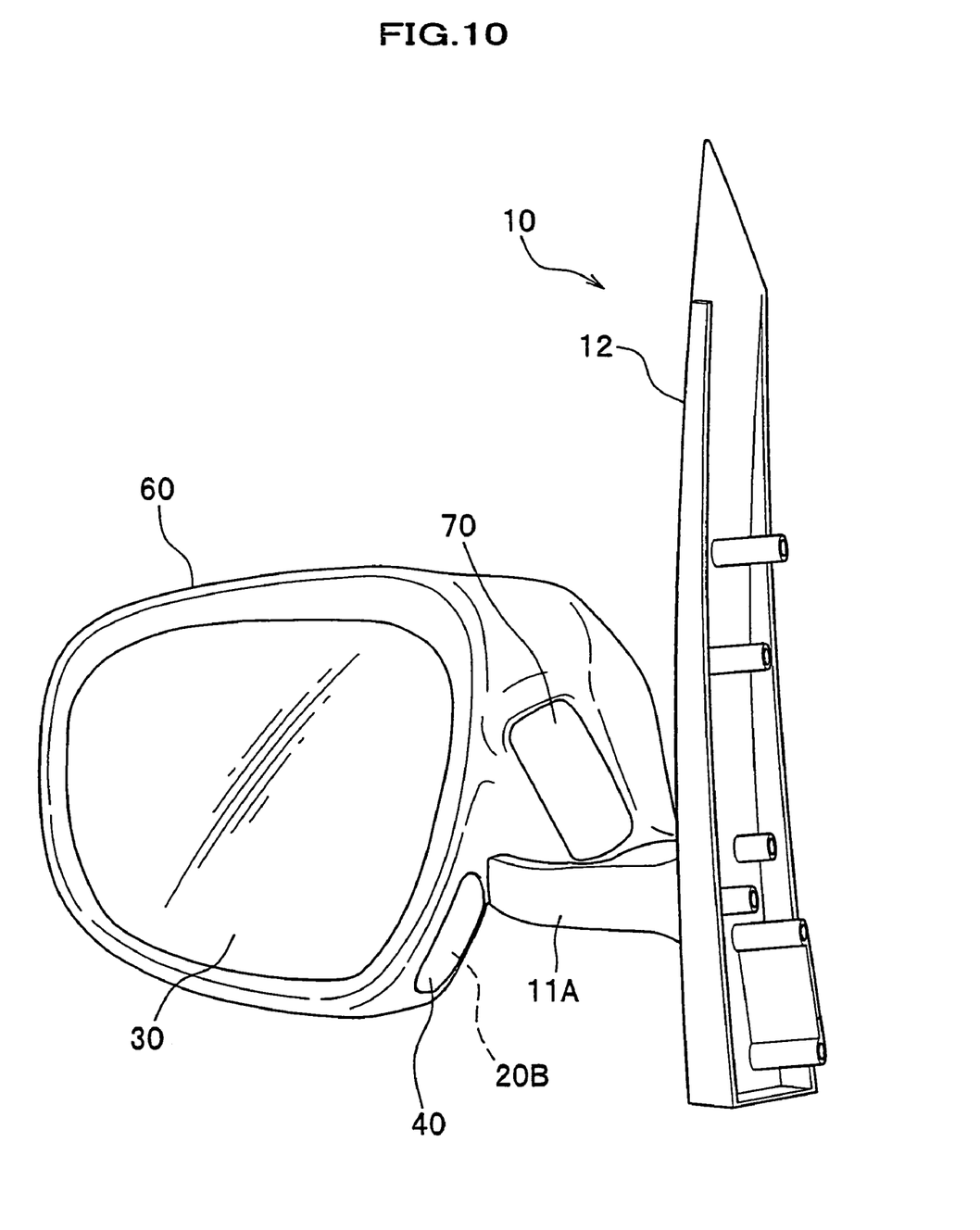
FIG. 10 is a perspective view of the outer mirror according to the second embodiment of the present invention seen from the rear side.

An outer mirror according to a second embodiment of the present invention is characterized in that an auxiliary rear view mirror 70 is introduced, as shown in FIGS. 9 and 10.

The auxiliary rear view mirror 70 is mounted on the mirror housing 60 at the position above the protrusion 11A (upper portion 60a on the side of the mirror housing 60). The mirror surface of the auxiliary rear view mirror 70 tilts down so as to face the ground. By introducing this auxiliary rear view mirror 70, the area around the rear side of the vehicle body A can be reflected.

According to this outer mirror, the area diagonally backward the side face of the vehicle body A can be checked by use of the auxiliary rear view mirror 70. When the auxiliary rear view mirror 70 is combined with the mirror 30 for viewing behind, the areas behind the vehicle body A, including those which in general cannot be seen from the driver seat, can be easily checked. In addition, since the auxiliary rear view mirror 70 is mounted on the mirror housing 60 at the position above the protrusion 11A, the shift of the sight line from the rear view mirror 30 is maintained minimum, which gives excellent viewability.

In the outer mirror of this embodiment, the auxiliary mirror 40 is mounted on the mirror housing 60 so that the auxiliary mirror 40 covers the opening 20B formed on the lower part of the vehicle body side surface of the mirror housing 60. Therefore, prior to covering the opening 20B with the auxiliary mirror 40, the interior of the mirror housing 20 is accessible from the opening 20B, similar to the outer mirror of the first embodiment previously mentioned.

In the above-described embodiments, the opening 20B is formed on the lower side of the mirror housing 20 which faces toward the vehicle body. However, the present invention is not limited thereto. Alternatively, the opening 20B may be formed on the top or the upper side. In addition, the shape or size of the opening 20B can be changed selectively as long as the tips of tools can be inserted thereto.

In the above-described embodiments, the outer mirror is configured so that the mirror housing 20 is fixed to the protrusion 11A protruding from the base main body 11 of the mirror base 10. However, there is no limitation with respect to the configuration, and the mirror base may be formed of the protrusion 11A alone. In other words, the protrusion 11A may be fixed directly to a pillar or a mounting stage of the vehicle body A, or to a front bottom corner of the side window SW in such manner that the protrusion 11A protrudes laterally away from the vehicle body A.

In the above-described embodiments, the outer mirror is mounted on the passenger seat side. However, the outer mirror may be mounted on the driver seat side. In this case, the auxiliary mirror 40 may be mounted on the mirror housing 20 in such manner that the auxiliary mirror 40 reflects the area around the rear side of the vehicle body A.

In the above-described embodiments, the outer mirror is an electrically-operated retractable mirror. However, there is no limitation with respect to the outer mirror, and the mirror may be a manual-operated retractable mirror, or a fixed type mirror.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. An outer mirror, comprising:
   a mirror base having a protrusion which sticks out laterally from a side face of a vehicle body;
   a shaft being placed on the protrusion;

a mirror housing being coupled to the shaft in a rotatable fashion, the mirror housing comprising:
   a mirror for showing an area behind the vehicle body, and
   an opening on its side that faces the vehicle body;
an auxiliary mirror for showing an area diagonally forward the vehicle body, the auxiliary mirror sealing the opening; and
the mirror housing further comprising a swelling portion sticking out from the side of the mirror housing and being positioned beneath the protrusion, the opening being formed on a side of the swelling portion which faces the vehicle body, the swelling portion having a through-hole on its portion that faces the protrusion, the insertion of the screw being performed via the through-hole, the through-hole being accessible externally through the opening.

2. The outer mirror according to claim 1,
wherein an inside of the mirror housing is accessible externally through the opening.

3. The outer mirror according to claim 1,
wherein the shaft is secured to the protrusion by at least one screw, and the screw is inserted into the protrusion from a bottom of the protrusion, and
wherein the insertion of the screw is performed through the opening.

4. The outer mirror according to claim 3,
wherein the mirror housing further comprises a swelling portion sticking out from the side of the mirror housing and being positioned beneath the protrusion, the opening being formed on a side of the swelling portion which faces the vehicle body, the swelling portion having a through-hole on its portion that faces the protrusion, the insertion of the screw being performed via the through-hole, the through-hole being accessible externally through the opening.

5. The outer mirror according to claim 4,
wherein the swelling portion is detachable from the mirror housing, and has a coupling portion being attachable to the mirror housing.

6. The outer mirror according to claim 1,
wherein the swelling portion is detachable from the mirror housing, and has a coupling portion being attachable to the mirror housing.

7. The outer mirror according to claim 1, further comprising a frame for supporting the mirror and being installed in the mirror housing with at least one screw through the opening,
wherein the installation of the frame is carried out in a direction perpendicular to an attachment direction of the mirror.

* * * * *